(12) United States Patent
Li et al.

(10) Patent No.: US 7,957,698 B2
(45) Date of Patent: Jun. 7, 2011

(54) DEMODULATOR WITH OUTPUT LEVEL CALIBRATION

(75) Inventors: Tsung-Ling Li, Ping-Tung County (TW); Hsiang-Hui Chang, Taipei Hsien (TW); Chia-Huang Fu, Taipei (TW); En-Hsiang Yeh, Hsinchu (TW); Hsueh-Kun Liao, Hsin-Chu Hsien (TW); Chieh-Hung Chen, Hsinchu (TW)

(73) Assignee: Mediatek Inc., Science-Based Industrial Park, Hsinchu (TW)

( * ) Notice: Subject to any disclaimer, the term of this patent is extended or adjusted under 35 U.S.C. 154(b) by 757 days.

(21) Appl. No.: 12/045,707

(22) Filed: Mar. 11, 2008

(65) Prior Publication Data

US 2009/0233566 A1  Sep. 17, 2009

(51) Int. Cl.
*H04B 17/00* (2006.01)
*H04B 1/16* (2006.01)
(52) U.S. Cl. .......... 455/67.11; 455/337; 455/226.1
(58) Field of Classification Search .......... 455/293, 455/337, 21, 130, 67.11, 67.14, 226.1
See application file for complete search history.

(56) References Cited

U.S. PATENT DOCUMENTS

| 6,188,275 | B1 * | 2/2001 | Mattisson et al. | 329/311 |
| 6,199,594 | B1 * | 3/2001 | Mezzalira | 138/130 |
| 6,603,810 | B1 * | 8/2003 | Bednekoff et al. | 375/228 |
| 6,895,229 | B2 * | 5/2005 | Schetelig et al. | 455/226.1 |
| 7,181,205 | B1 * | 2/2007 | Scott et al. | 455/423 |
| 7,541,815 | B2 * | 6/2009 | Ichiyama et al. | 324/537 |
| 7,554,332 | B2 * | 6/2009 | Ichiyama et al. | 324/500 |

* cited by examiner

*Primary Examiner* — Sonny Trinh
(74) *Attorney, Agent, or Firm* — Winston Hsu; Scott Margo

(57) ABSTRACT

A calibration circuit for calibrating an output level of a demodulator includes a test signal generator, an RSSI module and a calibration module. The test signal generator generates a test signal, and the RSSI module detects the test signal to generate a control signal, wherein the control signal controls the demodulator to process the test signal to generate a determined output signal. The calibration module then calibrates the RSSI module according to the output signal in order to calibrate the output level of the demodulator. When the control signal is utilized to selectively enable or disable a soft-mute function of the demodulator, the calibration module can be utilized to calibrate or determine the soft-mute function of the demodulator.

22 Claims, 6 Drawing Sheets

US 7,957,698 B2

DEMODULATOR WITH OUTPUT LEVEL CALIBRATION

BACKGROUND

The present invention relates to a calibration circuit and a calibration method thereof, and more particularly, to a calibration circuit for calibrating an output level of a demodulator, and a calibration method thereof.

An FM demodulator demodulates FM signals into audio signals, and controls volume of the audio signals to be played to users. The volume control of the audio signals depends on the signal quality of the FM signals. When signal strength of the FM signal is weak (the signal-to-noise ratio of the FM signal is less than a certain threshold), the FM demodulator attenuates its output (i.e. the audio signals) to decrease noise effect. This operation is referred to as "soft mute".

Traditionally, as shown in FIG. 1, an FM demodulator 110 is coupled to an amplifier 120 and a received signal strength indicator (RSSI) module 130 to receive an FM signal amplified by the amplifier 120 and signal strength of the FM signal detected by the RSSI module 130. In the RSSI module 130, a comparator 132 compares a RSSI signal $S_{FM}$ generated by a RSSI unit 131 with a reference signal $S_{ref}$ generated by a reference voltage source 133. When the signal strength of the $S_{FM}$ is equal to the strength of the reference signal $S_{ref}$, the RSSI module 130 outputs a control signal to the FM demodulator 110 to start the soft-mute function, i.e. to start to attenuate the audio signal.

The attenuation degree of the audio signal can be represented by a chart, as shown in FIG. 2. The real line in FIG. 2 shows an ideal soft-mute curve, showing that the soft-mute function starts at a selected point S1 and attenuates the audio signals according to a specific slope. The process variations of the FM demodulator 110, the amplifier 120 and the RSSI module 130, however, affect the start point and the slope of the ideal soft-mute curve. The practical attenuation executed by the FM demodulator 110 is represented by the dotted lines shown in FIG. 2. The input voltage offsets of the FM demodulator 110, the comparator 132, the reference voltage source 133 and buffers in the RSSI unit 131 cause the start point to drift away from S1. The gain variations of the FM demodulator 110, the amplifier 120 and the comparator 132 result in slope variation. As the practical soft-mute result varies from the ideal design, the audio signal output from the FM demodulator 110 cannot be optimum.

SUMMARY

One objective of the present invention is therefore to provide a calibration circuit for calibrating an output level of a demodulator, and a calibration method thereof. By introducing a test signal with known signal strength, the calibration circuit can compensate the control signal of the RSSI module, and calibrate the output level of the demodulator, thereby resolving the above problems.

According to an exemplary embodiment of the present invention, a calibration circuit for calibrating an output level of a demodulator is disclosed. The calibration circuit comprises a test signal generator, a RSSI module and a calibration module. The test signal generator generates a test signal, and the RSSI module detects the test signal to generate a control signal, wherein the control signal controls the demodulator to process the test signal to generate an output signal. The calibration module then calibrates the RSSI module according to the output signal in order to calibrate the output level of the demodulator.

According to another exemplary embodiment of the present invention, a method of calibrating an output level of a demodulator controlled by an RSSI module is disclosed. The method comprises generating a test signal, detecting the test signal with the RSSI module to generate a control signal, processing the test signal with the demodulator according to the control signal to generate an output signal, and calibrating the RSSI module according to the output signal in order to calibrate the output level of the demodulator.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 2:
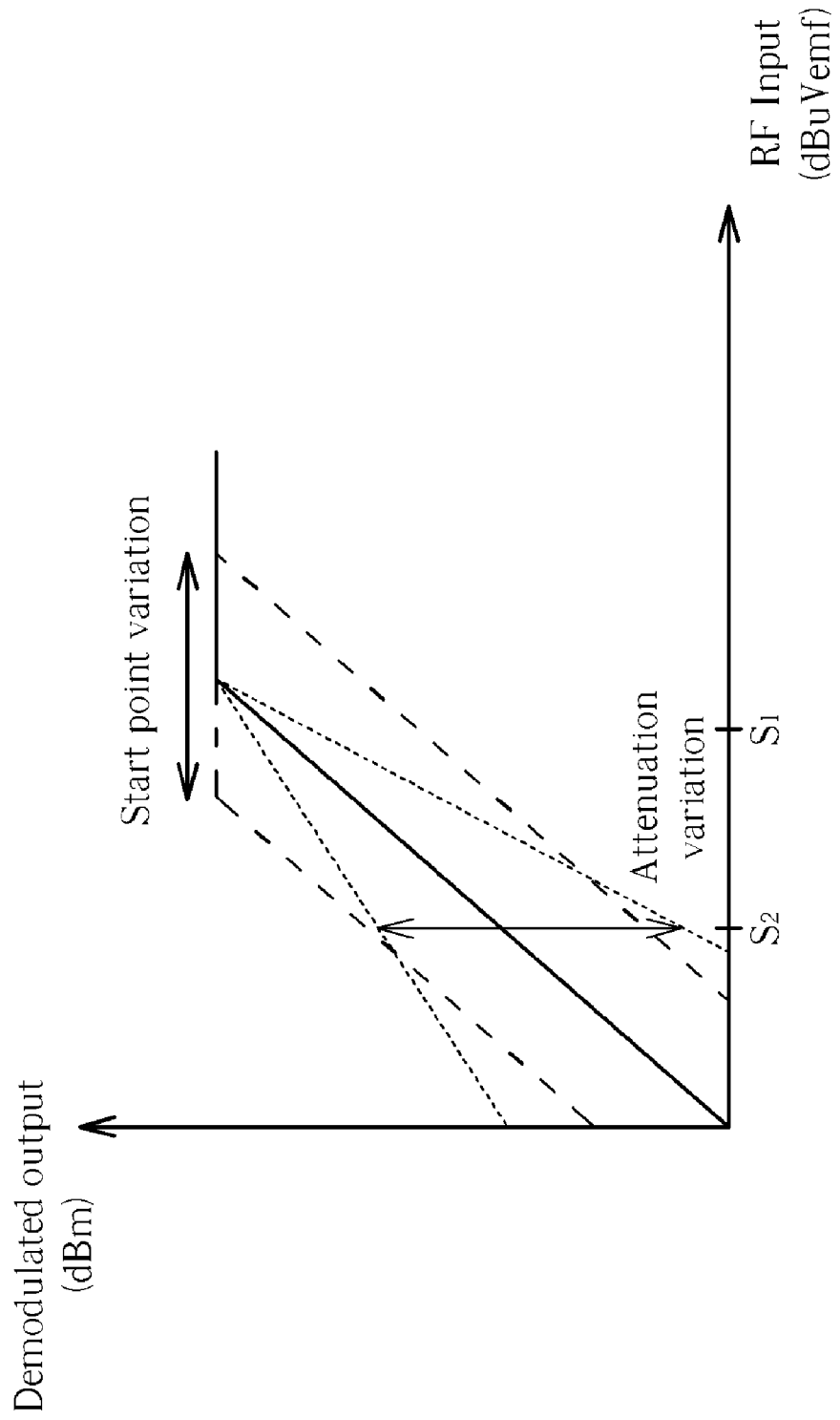
FIG. 2 shows ideal and practical soft-mute functions of the demodulator.
Figure 3:
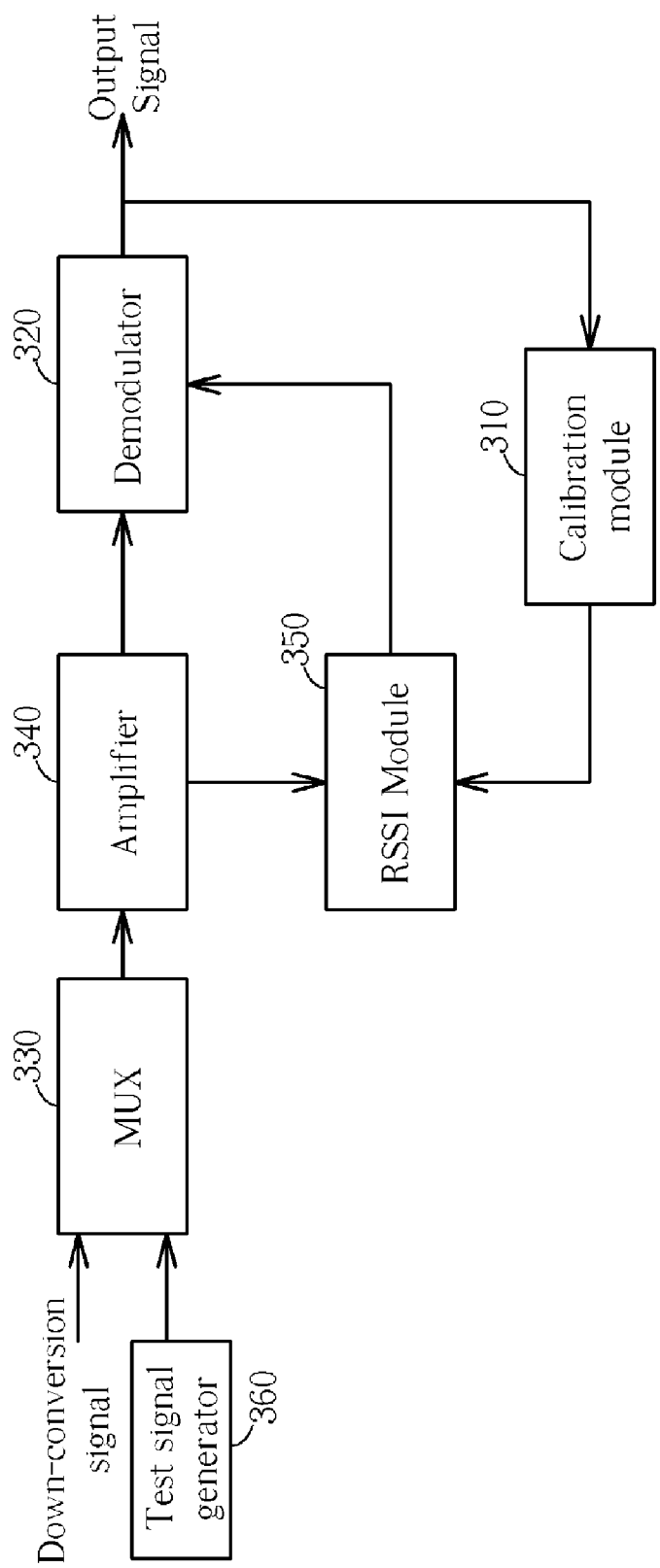
FIG. 3 is a block diagram of a calibration circuit implemented to calibrate an output level of a demodulator according to an exemplary embodiment of the present invention.

FIG. 3 is a block diagram of a calibration module 310 implemented to calibrate an output level of a demodulator 320 according to an exemplary embodiment of the present invention. The demodulator 320 demodulates an input down-conversion signal to generate an output signal according to a control signal of the RSSI module 350. The calibration module 310 calibrates the output level of the demodulator 320 by calibrating the RSSI module 350 according to the output signal. Referring to the input-output relationship curves shown in FIG. 2, it is found that a first predetermined signal strength S1 corresponds to a specific characteristic of the ideal curve, e.g. the turning point, and a second predetermined signal strength S2 corresponds to another specific characteristic of the curve, e.g. the slope. Therefore, when the output levels of these two input signal strengths S1 and S2 are calibrated, the output level of the demodulator 320 is calibrated.

In one embodiment, the calibration of the output level of the demodulator 320 roughly includes two stages: calibrating the input offset (first calibration stage) and calibrating the gain variation (second calibration stage). The present invention, however, is not limited to take place in two stages. The first or second calibration stage being performed separately to obtain better demodulation performance also belongs to the scope of the present invention.

Figure 4:
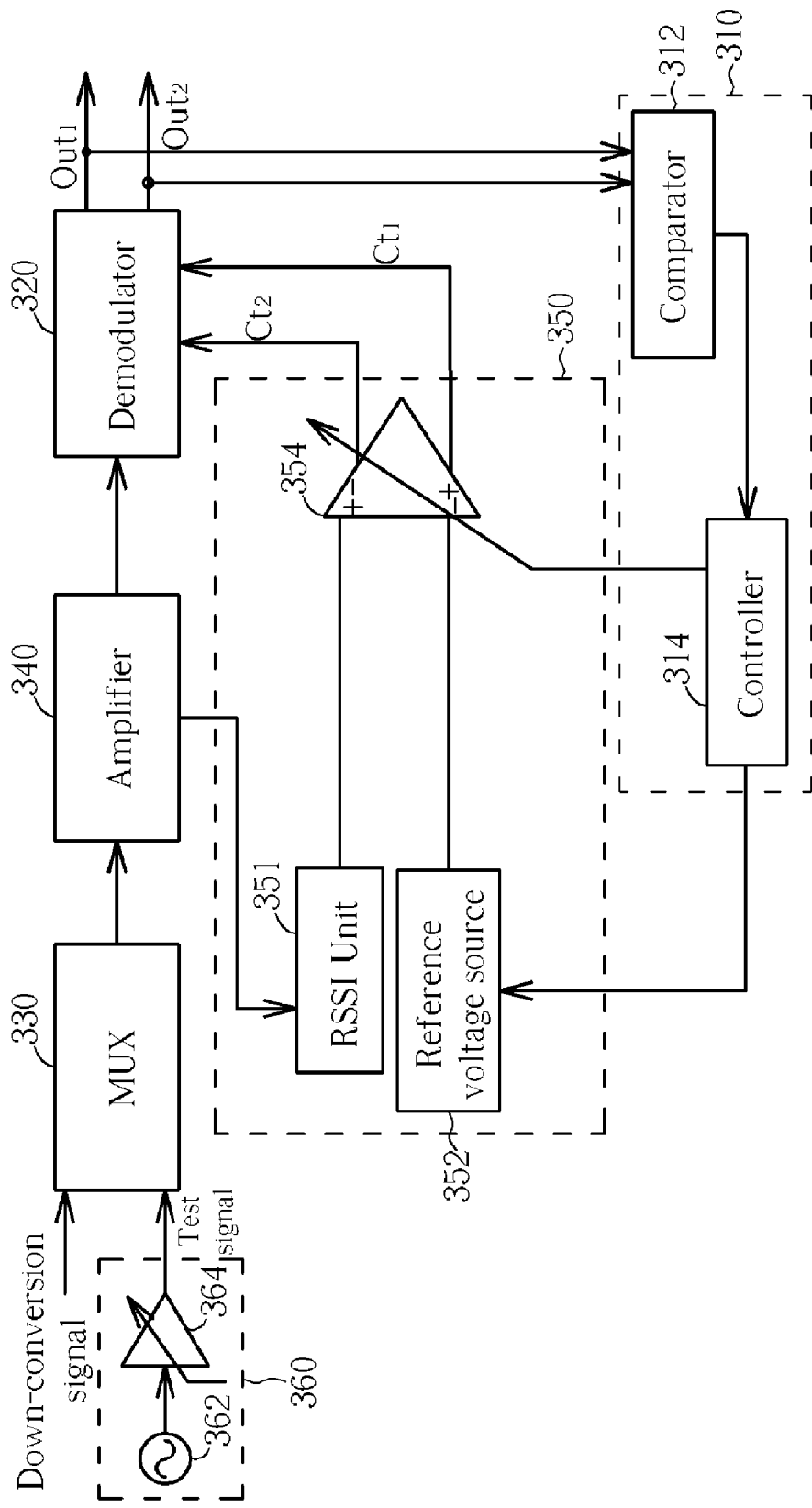
FIG. 4 is a detailed diagram of the calibration circuit shown in FIG. 3 according to an exemplary embodiment of the present invention.

In the first calibration stage, in order to calibrate the input offset of the demodulator 320 and the RSSI module 350, a test signal with predetermined signal strength S1 (i.e. the desired input signal strength at which the demodulator 320 starts to adjust its output signal strength) is provided by the test signal generator 360. Please refer to FIG. 4. The test signal generator 360 includes an oscillator 362 and an adjusting circuit 364, wherein the oscillator 362 generates a down-conversion signal, and the adjusting circuit 364 controls amplitude of the down-conversion signal in order to form a test signal with specific frequency band and signal strength S1. The test signal generator 360 and the demodulator 320 can be built in a same chip to decrease production cost and simplify the manufacturing process. For example, an internal oscillator is adopted in the chip as the oscillator 362. Please note that this is only an embodiment, and not a limitation of the present invention.

Figure 1:
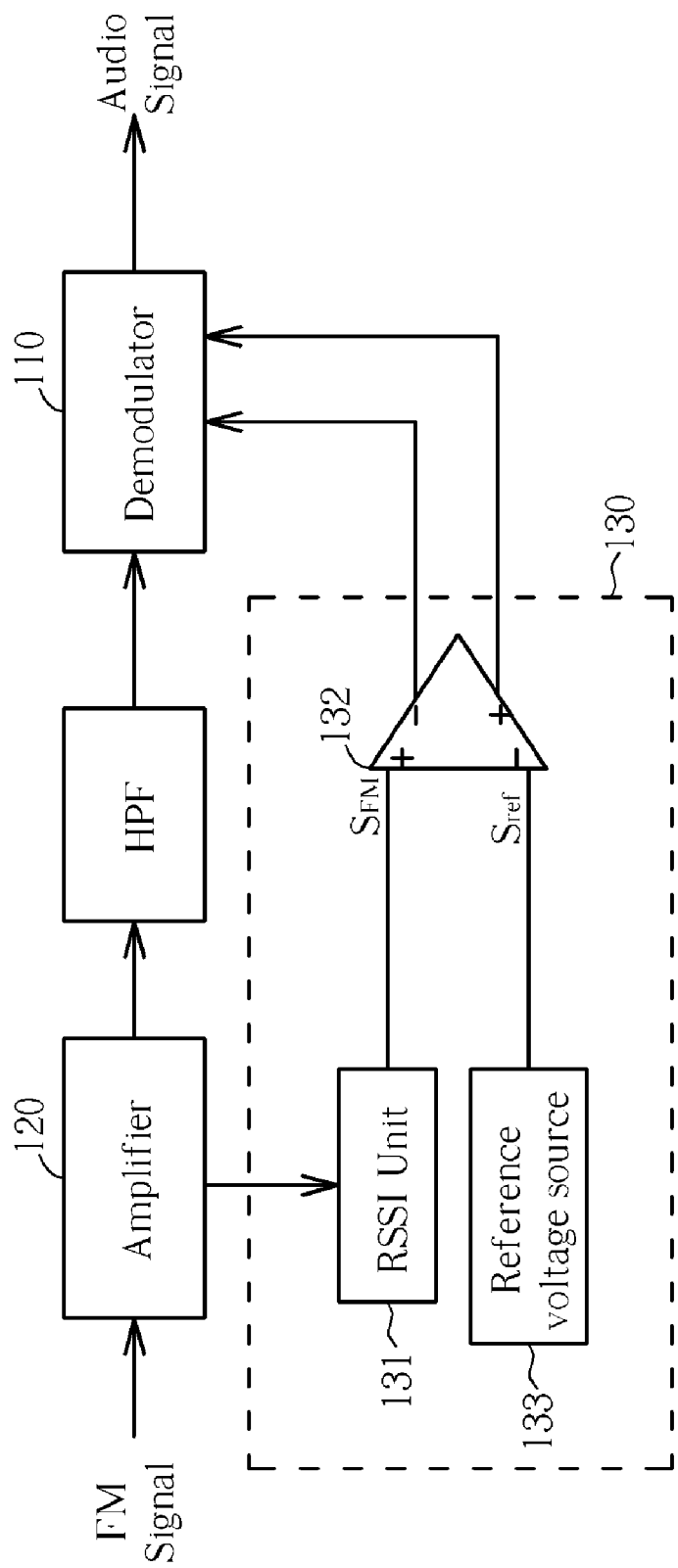
FIG. 1 is a block diagram showing an FM demodulator coupled to an amplifier and a received signal strength indicator module.

A multiplexer 330 selects and outputs the test signal to the amplifier 340, and the test signal is then sent to a RSSI unit 351 of the RSSI module 350. The RSSI module 350 compares the output signal generated by the RSSI unit 351 with a reference signal generated by a reference voltage source 352. The difference between the RSSI module 350 and the conventional RSSI module shown in FIG. 1 is that the reference voltage source 352 is adjustable. For example, it can be a digital-to-analog converter controlled by the calibration module 310. The comparator 354 of the RSSI module 350 generates the differential control signal including a first control signal Ct1 corresponding to the positive control terminal and a second control signal Ct2 corresponding to the negative control terminal. Then the demodulator 320 processes the test signal received from the amplifier 340 according to the first control signal Ct1 and the second control signal Ct2. More specifically, the demodulator 320 generates a first output signal Out1 and a second output signal Out2 according to the first control signal Ct1 and the second control signal Ct2.

Figure 5:
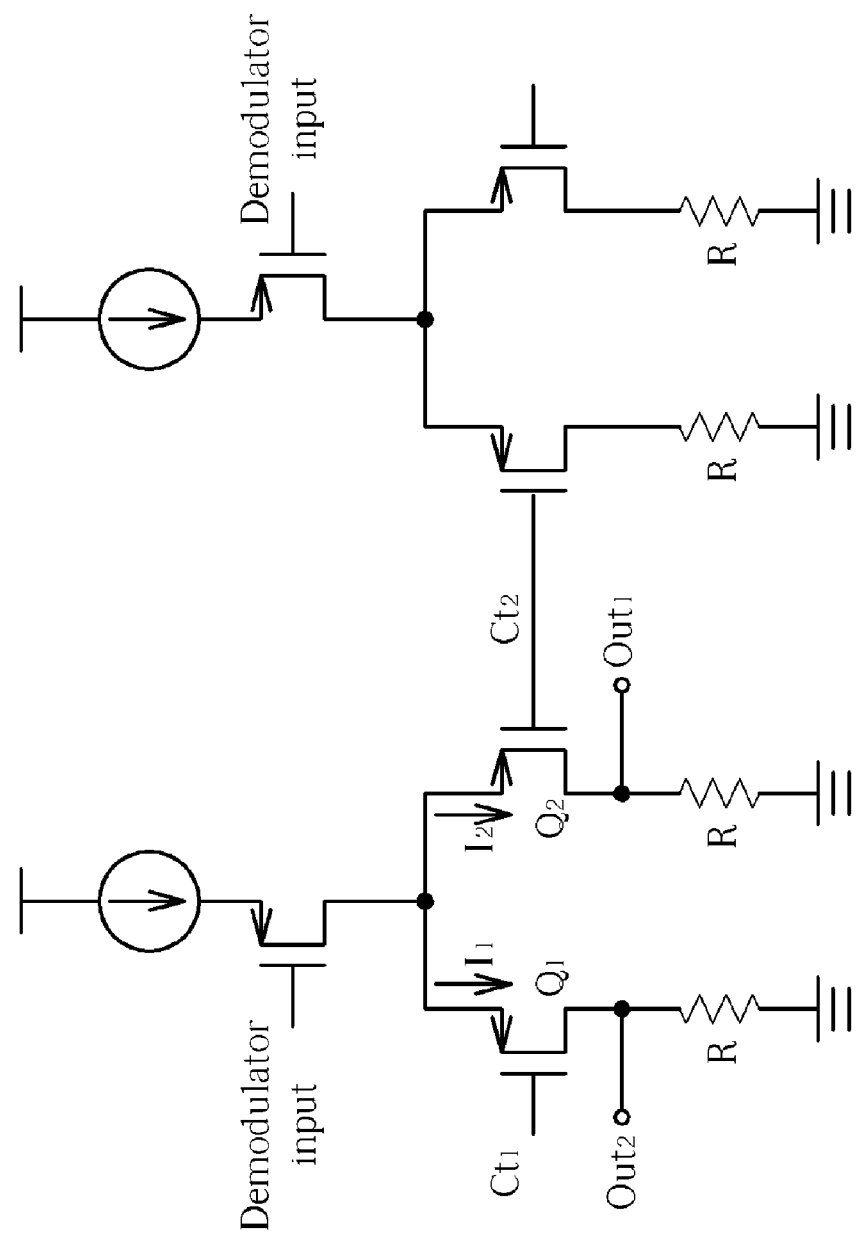
FIG. 5 shows an output circuit of the demodulator according to an exemplary embodiment of the present invention.

FIG. 5 shows an output circuit of the demodulator 320 according to an exemplary embodiment of the present invention. As can be seen from FIG. 5, the first and the second control signals Ct1 and Ct2 enable the transistors Q1 and Q2 and conducting currents I1 and I2 to generate the first and the second output signals Out1 and Out2 at drains of the transistors Q1 and Q2, respectively. If the first control signal Ct1 is equal to the second control signal Ct2, the currents flowing through transistors Q1 and Q2 will be the same, and the first and the second output signals Out1 and Out2 will also be the same. For this reason, in this embodiment, the calibration module 310 detects the first and second output signals Ou1 and Out2, and adjusts the reference voltage source 352 when the first output signal Out1 is not equal to the second output signal Out2. The adjustment of the reference voltage source 352 is for making the first output signal Out1 equal to the second output signal Out2, which will be achieved when the reference voltage level of the reference voltage source 352 has been calibrated to have the value S1.

In one embodiment, the calibration module 310 includes a comparator 312 and a controller 314. The comparator 312 determines if the first output signal Out1 is equal to the second output signal Out2, and then delivers the comparing result to the controller 314. When the comparing result indicates that the first output signal Out1 is not equal to the second output signal Out2, the controller 314 (a successive approximation register (SAR) in this embodiment) gradually adjusts the reference voltage source 352 (which will change the second control signal Ct2 and the second output signal Out2 correspondingly) until the comparator 312 has detected that the first output signal Out1 is equal to the second output signal Out2. In this way, the reference voltage level of the RSSI module 350 is calibrated to be close to the predetermined value S1, and the input offset is thereby compensated.

Figure 6:
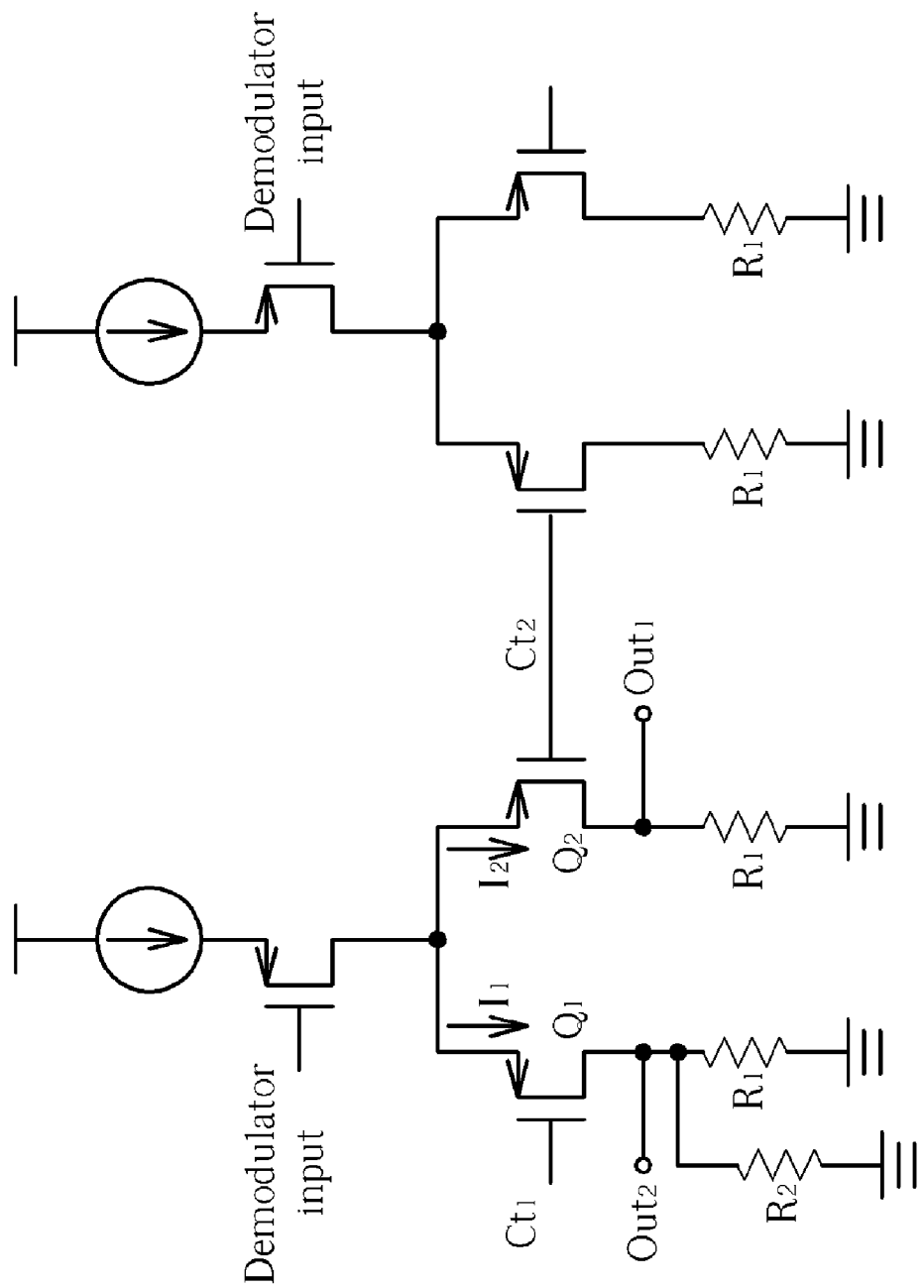
FIG. 6 shows a modified output circuit of the demodulator according to an exemplary embodiment of the present invention.

In the second calibration stage, the calibration module 310 compensates the gain variation caused by the demodulator 320, the amplifier 340 and the comparator 354 by calibrating output gain of the RSSI module 350. Firstly, a test signal with predetermined signal strength S2 is generated. The comparator 354 compares the test signal with the reference signal, which has been calibrated to have the desired reference voltage level S1 in the first calibration stage. The comparator 354 then generates the differential output signal of a first control signal Ct1 and a second control signal Ct2 to the demodulator 320. Since the signal strength S2 of the test signal is lower than that of the reference signal, the current I1 flowing through the transistor Q1 is greater than the current I2 flowing through the transistor Q2; that is, the second output signal Out2 will always be larger than the first output signal Out1. Therefore, in this situation, the calibration module 310 cannot utilize a simple comparator that can only detect whether the first and the second output signals are equal to each other. A more complex comparator, such as an analog-to-digital converter, is required. In order to solve this problem to reduce the production cost, a circuit is provided as shown in FIG. 6. An impedance (a resistor in this embodiment) R2 is coupled to the drain of the transistor Q1 to let the total impedance coupled to the drain of the transistor Q1 be less than the impedance coupled to the drain of the transistor Q2. As a result, even though the current I1 is always larger than the current I2, the output signals Out1 and Out2 can still be the same. The structure and computation complexity of the calibration module 310 can therefore be reduced because a simple comparator can be adopted. In one embodiment, the impedance of R1 parallel to R2 (R1//R2) is designed to be the impedance of R1 multiplied by a factor (−A), where A is the desired slope determined by S1 and S2 as shown in FIG. 2.

The demodulator generates the first output signal Out1 and the second output signal Out2 according to the first control signal Ct1 and the second control signal Ct2. The comparator 312 then determines if the first output signal Out1 is equal to the second output signal Out2. When the comparing result indicates that the first output signal Out1 is not equal to the second output signal Out2, the controller 314 adjusts gain of the comparator 354, which is implemented by a programmable gain amplifier (PGA) in this embodiment. When the gain of the comparator 354 has been adjusted to let the first output signal Out1 be equal to the second output signal Out2, the gain variation is compensated, and the second calibration stage is complete. The impedance R2 is then decoupled from the transistor Q1, and the multiplexer 330 changes to input the down-conversion signal rather than the test signal to the amplifier 340 in order to switch the system back to the normal operation mode.

In another embodiment, an output stage (for example, an amplifier) of the demodulator 320 is segmented from the demodulator 320 to become a circuit connected after the demodulator 320. The control signal of the RSSI module 350 controls the output stage, and the calibration module 310 calibrates the RSSI module 350 according to the output signal of the output stage. The output level of the demodulator can be calibrated as well.

In the above embodiments, by comparing the output signal with a predetermined reference, and compensating the control signal of the RSSI module according to the comparing result, the output level of the demodulator can be calibrated. When the control signal is for selectively enabling or disabling a soft-mute attenuation implemented in the demodulator 320, the problems met by the prior arts (e.g. the practical soft-mute result varies from the ideal design) can be resolved. The audio signal output from the demodulator 320 is therefore optimum.

Those skilled in the art will readily observe that numerous modifications and alterations of the device and method may be made while retaining the teachings of the invention.

What is claimed is:

1. A calibration circuit for calibrating an output level of a demodulator, comprising:
   a test signal generator, coupled to the demodulator, for generating a test signal;
   a received signal strength indicator module, coupled to the demodulator and the test signal generator, for detecting the test signal to generate a control signal, wherein the control signal controls the demodulator to process the test signal to generate an output signal; and
   a calibration module, coupled to the demodulator and the received signal strength indicator module, for calibrating the received signal strength indicator module according to the output signal in order to calibrate the output level of the demodulator.

2. The calibration circuit of claim 1, wherein the test signal generator and the demodulator are built in a same chip.

3. The calibration circuit of claim 1, wherein the control signal includes a first control signal and a second control signal corresponding to the test signal and a reference voltage level of a reference source in the received signal strength indicator module; the output signal includes a first output signal and a second output signal, where the demodulator generates the first output signal and the second output signal according to the first control signal and the second control signal; the test signal generator generates the test signal according to a predetermined signal strength, and the calibrating module comprises:
   a comparator, coupled to the demodulator, for determining if the first output signal is equal to the second output signal to generate a comparing result; and
   a controller, coupled to the comparator and the received signal strength indicator module, for calibrating the control signal generated from the received signal strength indicator module according to the comparing result when the comparing result indicates that the first output signal is not equal to the second output signal.

4. The calibration circuit of claim 3, wherein the controller is a successive approximation register (SAR).

5. The calibration circuit of claim 3, wherein the controller calibrates an input voltage offset of the received signal strength indicator module.

6. The calibration circuit of claim 5, wherein the controller calibrates the input voltage offset of the received signal strength indicator module by calibrating the reference voltage level of the reference voltage source according to the comparing result.

7. The calibration circuit of claim 3, wherein the controller calibrates a gain variation of the received signal strength indicator module.

8. The calibration circuit of claim 7, wherein the controller calibrates the gain variation of the received signal strength indicator module by calibrating an output gain of the received signal strength indicator module according to the comparing result.

9. The calibration circuit of claim 8, wherein the controller calibrates the output gain of the received signal strength indicator module by calibrating gain of an amplifier of the received signal strength indicator module according to the comparing result, where the amplifier is for generating the first control signal and the second control signal to the demodulator.

10. The calibration circuit of claim 3, wherein the demodulator comprises:
    a first transistor, having a control end for receiving the first control signal, a first end coupled to a current source, and a second end for outputting the first output signal; and
    a second transistor, having a control end for receiving the second control signal, a first end coupled to the current source, and a second end for outputting the second output signal;
    wherein an impedance coupled to the second end of the first transistor is controlled to be unequal to an impedance coupled to the second end of the second transistor when the controller calibrates the output gain of the received signal strength indicator module.

11. The calibration circuit of claim 1, further comprising a multiplexer, coupled to the test signal generator, the demodulator and the received signal strength indicator module, for selectively outputting the test signal into the demodulator and the received signal strength indicator module.

12. The calibration circuit of claim 1, wherein the control signal is to selectively enable or disable a soft mute attenuation implemented in the demodulator.

13. A method of calibrating an output level of a demodulator controlled by a received signal strength indicator module, comprising:
    generating a test signal;
    detecting the test signal by the received signal strength indicator module to generate a control signal;
    processing the test signal by the demodulator according to the control signal to generate an output signal; and
    calibrating the received signal strength indicator module according to the output signal in order to calibrate the output level of the demodulator.

14. The method of claim 13, wherein the step of generating the test signal comprises generating the test signal by a circuit of a chip where the demodulator is disposed.

15. The method of claim 13, wherein the control signal includes a first control signal and a second control signal corresponding to the test signal and a reference voltage level; the output signal includes a first output signal and a second output signal, where the demodulator generates the first output signal and the second output signal according to the first control signal and the second control signal; the test signal is generated according to a predetermined signal strength; and the step of calibrating the received signal strength indicator module comprises:
    determining if the first output signal is equal to the second output signal to generate a comparing result; and
    when the comparing result indicates that the first output signal is not equal to the second output signal, calibrating the control signal generated from the received signal strength indicator module according to the comparing result.

16. The method of claim 15, wherein the step of calibrating the received signal strength indicator module comprises calibrating an input voltage offset of the received signal strength indicator module.

17. The method of claim 16, wherein the step of calibrating the input voltage offset of the received signal strength indicator module comprises calibrating the reference voltage level according to the comparing result.

18. The method of claim 15, wherein the step of calibrating the received signal strength indicator module comprises calibrating a gain variation of the received signal strength indicator module.

19. The method of claim 18, wherein the step of calibrating the gain variation of the received signal strength indicator module comprises calibrating an output gain of the received signal strength indicator module according to the comparing result.

20. The method of claim 19, wherein the step of calibrating the output gain of the received signal strength indicator module comprises calibrating gain of an amplifier in the received signal strength indicator module according to the comparing result, where the amplifier is for generating the first control signal and the second control signal to the demodulator.

21. The method of claim 19, wherein the demodulator comprises:
 a first transistor, having a control end for receiving the first control signal, a first end coupled to a current source, and a second end for outputting the first output signal; and
 a second transistor, having a control end for receiving the second control signal, a first end coupled to the current source, and a second end for outputting the second output signal; and
 the step of calibrating the output gain of the received signal strength indicator module further comprises:
 controlling an impedance coupled to the second end of the first transistor to be unequal to an impedance coupled to the second end of the second transistor.

22. The method of claim 13, wherein the control signal selectively enables or disables a soft mute attenuation implemented in the demodulator.

\* \* \* \* \*